United States Patent Office 3,100,786
Patented Aug. 13, 1963

3,100,786
ACTIVATION OF ALUMINUM AND PREPARATION OF ALUMINUM HYDROCARBYLS THEREWITH
Herbert B. Fernald, Pittsburgh, Pa., assignor to Goodrich-Gulf Chemicals, Inc., Pittsburgh, Pa., a corporation of Delaware
No Drawing. Filed Sept. 26, 1956, Ser. No. 612,117
21 Claims. (Cl. 260—448)

This invention relates to the preparation of aluminum hydrocarbyls through the direct reaction of aluminum with olefinic hydrocarbons and hydrogen.

Aluminum hydrocarbyls, for example the aluminum alkyls, have become important chemical tools. They have achieved widespread interest as catalysts or catalyst components in the polymerization of olefins and as intermediates in the synthesis of alcohols from olefins.

Heretofore, the preparation of aluminum hydrocarbyls by the direct reaction between aluminum, hydrogen and olefinic hydrocarbons has been difficult and relatively costly because, in the activation of the aluminum to render it reactive with the olefin, it has been necessary to mechanically subdivide the aluminum by grinding in a ball mill, colloid mill or the like. Although the activated aluminum can then be reacted in the activating vessel with the olefin, it is preferred commercially to employ separate vessels for the olefin reaction. This involves the handling and transfer of a highly pyrophoric suspension of the activated aluminum and in addition to presenting a fire hazard requires the complete exclusion of air, moisture and other materials reactive with the aluminum in this state. The precautions necessary in handling the activated aluminum suspensions also add to the manufacturing cost of the desired aluminum hydrocarbyl product.

It has now been found that aluminum can be readily and quickly activated for the reaction with the olefinic hydrocarbon and hydrogen without mechanically subdividing the aluminum. The activation may be, and preferably is, conducted in the same vessel employed for the reaction. In accordance with the present invention, aluminum hydrocarbyls, including trihydrocarbyl aluminums and hydrocarbyl aluminum hydrides, are prepared by contacting metallic aluminum with an activating material selected from the class consisting of the alkali metals and the alkaline earth metals and reacting the actviated aluminum with an olefinic hydrocarbon and hydrogen to obtain an aluminum hydrocarbyl product. The activation can be conducted substantially simultaneously with the synthesis of the aluminum hydrocarbyls, that is, the aluminum is reacted in the presence of an activator with an olefinic hydrocarbon and hydrogen; or the aluminum can be activated separately by contact with the activator, and then reacted with the olefinic hydrocarbon and hydrogen. The former procedure is preferred since it is less time consuming in avoiding a separate activation period.

The reaction between the activated aluminum, the olefin and hydrogen proceeds according to the following equation in which isobutylene is employed as the olefin for purposes of illustration:

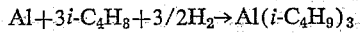

Al+3i-C$_4$H$_8$+3/2H$_2$→Al(i-C$_4$H$_9$)$_3$

Some hydride, for example, diisobutyl aluminum hydride, may be formed at the same time either directly or by decomposition of the trihydrocarbyl aluminum. Such mixtures of trihydrocarbyl aluminum and hydrocarbyl aluminum hydride can be employed as polymerization catalysts. However, if desired, the crude hydride-containing product can be converted quite completely to the trihydrocarbyl by reacting with excess olefin. Alternatively, the crude product can be distilled to separate the hydride from the trihydrocarbyl.

As has been stated, the aluminum is activated for direct reaction with an olefinic hydrocarbon and hydrogen by treatment with an alkali metal or an alkaline earth metal. In the activation of the aluminum and in the synthesis reaction, it is preferred that the activating material and the aluminum be relatively finely divided. For example, atomized aluminum powders of average particle diameters of 9 microns, 25 microns and 30 microns, and sodium dispersions in which the sodium has an average particle diameter of 15 microns have been used successfully. However, considerably coarser materials can also be employed. For example, aluminum turnings of the approximate dimensions ⅛" x 1" x ½₂" and lithium wire having a diameter of about 1.5 to 2 mm. have been used with good results. The extent of subdivision of the aluminum and activator is therefore not critical, it being noted that, in accordance with known principles, coarser materials will not have as much surface area available for reaction and will result in somewhat slower overall reaction rates and somewhat lower yields of product.

If desired, the activator may be employed as a dispersion in a solvent inert to the hydrocarbyl synthesis reaction. These inert solvents are described in detail hereinafter in connection with the synthesis reaction and include such materials as the saturated aliphatic hydrocarbons and the aromatic hydrocarbons. Since the dispersions of activator in such solvents are used primarily for ease of handling finely divided activators and for preventing surface oxidation of the activator particles, particularly with the alkali-metal activators, the concentration of activator in solvent is not critical. Twenty-five (25), 50 and 75 percent by weight dispersions of activator in solvent are used successfully. Where the activators are used in relatively large pieces, or where they are obtainable as powders as in the case of the alkaline earth metals, it is not necessary to disperse the activators in a solvent.

The activating materials of the invention include sodium, lithium, potassium, cesium and rubidium metals, as well as calcium, barium, strontium and magnesium metals. Of these materials, sodium is preferred because of its relatively low cost and availability. These activators are employed in an amount sufficient to activate the aluminum. It has been found that extremely small amounts of the activating material are sufficient for this purpose. Thus, after a series of synthesis runs according to the invention in which the aluminum had been activated with from about 1 to 2 percent of sodium metal based on the aluminum, another run was made in the same reaction vessel without adding any sodium. Sufficient sodium remained adsorbed or plated on the walls of the reaction vessel to activate the aluminum successfully while giving a good yield of the hydrocarbyl. From this experience, it is apparent that trace amounts of the activating material are sufficient to activate the aluminum. In the general practice of the invention, however, it is preferred to employ from about 0.25 to 2 percent by weight of the activating material, based on the weight of the aluminum. In so doing, the presence of sufficient activating material is always assured.

It has also been found that the activating material combines with the aluminum, hydrogen and olefin to form complexes. For example, in the case of using sodium as the activator and isobutylene as the olefin, the alkyl aluminum product obtained will contain some sodium aluminum isobutyl, NaAl(i-C$_4$H$_9$)$_4$, and other complexes. The amount of such complexes will increase with the amount of activating material employed until solids can be observed in the product. This is observed at concentrations of activating material in excess of about 1 to 1.5 percent by weight. At concentrations of about 10 to 25 percent by weight relatively large amounts of precipitated solid complexes are formed. Since these complexes are formed at the expense of the hydrocarbyl aluminum compounds which are the desired products, it will ordinarily be desirable to avoid concentrations of activating material in excess of about 1 to 2 percent. However, since the hydrocarbyl aluminum compounds are also formed along with the complexes, the larger amounts of activating material can be used if desired. If a substantially pure hydrocarbyl aluminum product is desired, the complexes and other materials can be removed by filtration and/or distillation of the final product.

From the foregoing, it will be observed that the activating materials are used in amounts ranging from trace amounts to about 25 percent by weight of the aluminum, and that preferred amounts range from about 0.25 to 2 percent.

Any olefinic hydrocarbon is employed in the preparation of hydrocarbyl aluminum compounds in accordance with the invention. Suitable olefinic hydrocarbons include the straight and branched chain aliphatic mono-olefins, alicyclic olefins, the corresponding diolefins and the aryl olefins. For example, ethylene, propylene, butene-1, butene-2, isobutylene, pentene-1, pentene-2, hexene-1, 2-methyl pentene-1, the mixed heptenes obtained by the copolymerization of propylene and butylenes in the presence of a phosphoric acid catalyst, octene-1, octene-2 2-ethyl hexene-1, diisobutylene, propylene trimer, decene-1, propylene tetramer, triisobutylene and the like are satisfactorily employed. Similarly, cyclopentene, cyclohexene and their alkyl derivatives, styrene, alpha-methylstyrene, indene and the like form hydrocarbyl aluminum compounds. Butadiene, isoprene, piperylene, hexadiene (diallyl) comprise suitable diolefins. Mixtures of the above olefins, as well as mixtures such as are obtained in refinery gas, or by the thermal cracking of paraffin wax, foots oil, or relatively paraffinic liquid petroleum fractions can also be employed.

The terminal or alpha mono-olefins form a preferred class. When an internal olefin such as butene-2 is employed, a portion is isomerized to butene-1 and the resulting tributyl aluminum contains a mixture of n-butyl and sec-butyl radicals. While in many applications, as in catalysis for example, the presence of mixed hydrocarbyl radicals in the hydrocarbyl aluminum is not significant, where it is desired to prepare a relatively pure derivative, for example an alcohol through oxidation of the hydrocarbyl aluminum and hydrolysis of the oxidized product, the presence of mixed hydrocarbyl radicals in the starting hydrocarbyl aluminum will preclude obtaining a pure derivative. The specifically preferred alpha mono-olefin is isobutylene. This olefin is relatively cheap, readily available and easily forms triisobutyl aluminum in accordance with the invention.

In the practice of the aluminum hydrocarbyl synthesis, the presence of a liquid phase is desirable. This liquid can be a solvent inert to the reaction, an aluminum hydrocarbyl product or a liquid olefinic hydrocarbon reactant. Suitable inert solvents are the saturated aliphatic hydrocarbons, such as the pentanes, hexane, cyclohexane, heptane, octane and the like, the aromatic hydrocarbons, such as benzene, toluene and the xylenes, and any mixtures thereof. In a preferred embodiment the liquid employed is the same aluminum hydrocarbyl reaction product that is to be prepared. This aluminum hydrocarbyl can be a trihydrocarbyl aluminum, a dihydrocarbyl aluminum hydride, or a mixture thereof. This has the advantage of eliminating the recovery of the aluminum hydrocarbyl product from solvent. When the olefinic hydrocarbon reactant is a liquid under the reaction conditions employed, no additional liquid need be employed. It is advantageous to have one of the described liquids present in the synthesis process of this invention in order to insure efficient contact between the solid aluminum, gaseous hydrogen and the olefinic hydrocarbon which may or may not be liquid. Because of the diverse phases present, good agitation is required and the efficiency of contact between the reactants induced by agitation is enhanced by the presence of liquid. The amount of inert solvent or hydrocarbyl aluminum product, when employed, is not critical. A sufficient amount is used to give a reaction mass which can readily be stirred. For example, an amount of insert solvent or hydrocarbyl aluminum equal to the weight of the aluminum reactant gives good results. When the olefinic hydroacrbon reactant constitutes the liquid phase, the amount employed is governed by its proportion as a reactant, as herein after described.

In view of the consumption of hydrogen in the reaction to form an aluminum hydrocarbyl, it is preferred to employ superatmospheric pressures at the reaction temperatures. Pressures as low as 500 pounds per square inch gauge can be employed, but higher pressures promote faster reaction rates. There have been used pressures ranging from about 1200 to 3400 p.s.i.g., but still higher pressures are also suitable. When a separate activation procedure is followed, that is, when the aluminum is first contacted with the activator for a period of time before the reaction with the olefinic hydrocarbon and hydrogen, atmospheric pressures can be employed as well as the higher pressures disclosed hereinabove for the aluminum hydrocarbyl synthesis reaction.

In conducting the synthesis reaction in the presence of the activator, the temperature of the reaction can be maintained in the range of about 100° to 240° C., or higher. The reaction is mildly exothermic. At reaction temperatures below about 125° C., the reaction, though observable, is slow. To obtain good synthesis reaction rates, a temperature range of about 150° to 185° C. is preferred. When the separate activation procedure is followed, temperatures ranging from room temperature to about 200° C. can be employed for this purpose.

The aluminum, olefinic hydrocarbon and hydrogen can be employed in the proportions in which they react to form a trihydrocarbyl aluminum product, that is, 3 mols of olefinic hydrocarbon per mol of aluminum and 1½ mols of hydrogen per mol of aluminum. However these exact proportions need not be followed since an aluminum hydrocarbyl product will be obtained from significant amounts of these materials in any proportion. In the actual practice of the invention to obtain aluminum hydrocarbyls, including trihydrocarbyl aluminum and dihydrocarbyl aluminum hydride, a 10 to 40 percent by weight excess of olefin over the amount theoretically required to produce trihydrocarbyl aluminum has been employed successfully. With respect to the hydrogen, a large excess over the theoretical has been employed to maintain the desired reaction pressure.

When conducting the synthesis in the presence of activator, the reactants and activator can be charged to the reactor susbtantially simultaneously or in any desired order, and then brought to reaction temperature. However, it is observed that faster reaction rates can be obtained by charging the aluminum, activator, solvent, if any, and a small portion of the olefinic hydrocarbon and hydrogen, then bringing the mixture to reaction temperature, and, as the reaction proceeds, continuosly feeding the hydrogen and olefinic hydrocarbon into the reactor at a mol ratio of at least 1:2.

The activated aluminum and aluminum hydrocarbyls are strong reducing agents and react readily with such materials as oxygen, moisture and carbon dioxide. Accordingly, in the activation of the aluminum and in the synthesis of the hydrocarbyls, an atmosphere of a dry inert gas is provided, for example, nitrogen, argon, helium or the like. Similarly, in the working up and storage of the hydrocarbyl reaction products, an inert atmosphere is provided.

In the actual practice of a preferred embodiment of the invention, a stirred autoclave is employed as the reactor. While maintaining an atmosphere of nitrogen therein, the autoclave is charged at room temperature with the aluminum, the inert solvent, if it is to be employed, is added, and the activator is then added. The autoclave is then closed. The olefinic hydrocarbon in the desired proportion is then pressured into the autoclave with nitrogen, and the hydrogen reactant is then pressured in to give the desired amount of hydrogen. The autoclave is then heated with stirring to the desired reaction temperature. As the reaction begins and continues, a drop in pressure is observed. After a pressure drop in the range of about 200 to 600 p.s.i.g., the autoclave is repressured to the original pressure with additional hydrogen. This repressuring with hydrogen is continued throughout the course of the reaction until the rate of drop in pressure become negligible. At that point the reaction is considered complete. The contents of the autoclave are then cooled to room temperature and the autoclave is vented to atmospheric pressure. The reaction product is pressured out of the autoclave with nitrogen and into a filter, where any solids such as unreacted aluminum or solid activator complexes are filtered off under nitrogen pressure. The filtrate is then subjected to a vacuum to remove any dissolved gases, and is stored under an atomsphere of inert gas.

The following examples are further illustrative of the invention.

Example 1

While maintaining an atmosphere of nitrogen in an autoclave equipped with means for agitation, heating and cooling, charge through a port in the cover 81 grams (3 mols) of an atomized aluminum powder having an average particle size of 9 microns. The screen analysis of this aluminum powder showed 99.9 percent through a 200 mesh screen and 97 percent through a 325 mesh screen. Then add in a similar manner 0.5 gram of sodium (0.62 percent by weight of the aluminum) as a 50 percent by weight dispersion in xylene and 87 grams of crude triisobutyl aluminum (containing diisobutyl aluminum hydride). Close the port and pressure into the autoclave 736 grams (13 mols) of liquid isobutylene with nitrogen. Add to the autoclave gaseous hydrogen until a pressure of 2000 p.s.i.g. is attained. This represents about 15 mols of hydrogen. While agitating vigorously, heat the contents of the autoclave to 155°–158° C. and maintain this temperature throughout the reaction. The pressure at this temperature is about 2800 p.s.i.g. The reaction starts in about 20 minutes as evidenced by a drop in pressure. When a pressure of 2500 p.s.i.g. is reached, hydrogen is pressured in until the original pressure of 2800 p.s.i.g. is attained. Thereafter, the reaction is allowed to continue with hydrogen repressuring as just described until the rate of drop in pressure is negligible, a period of 2 hours. The contents of the autoclave are cooled to about 30° C. and the autoclave is then vented to atmospheric pressure. The reaction product is then pressured out of the autoclave with nitrogen into a filter and filtered under a nitrogen atmosphere. The filtrate is subjected to a vacuum of about 10 to 15 mm. Hg at a temperature of about 35° to 40° C. to remove any dissolved hydrogen, nitrogen, isobutylene and isobutane which may be formed by hydrogenation of the isobutylene. The amount of isobutyl aluminum product is 638 grams, representing a yield of 89 percent based on the aluminum charged. The product, a water-white liquid, analyzes 13.45 percent aluminum (theoretical for triisobutyl aluminum, 13.64 percent) and contains 96.4 percent of triisobutyl aluminum and no diisobutyl aluminum hydride.

Example 2

Repeat the above example, except employ 0.7 gram of sodium (0.85 percent by weight of the aluminum) in a 50 percent by weight dispersion in xylene, 103 grams of crude triisobutyl aluminum, 734 grams isobutylene and a reaction temperature of 165° C. The reaction starts immediately upon reaching the reaction temperature and is complete in 50 minutes. Six hundred seventy-three (673) grams of product are obtained representing a yield of 91 percent, based on the aluminum. The crude product analyzes 13.2 percent aluminum and contains 89.8 percent triisobutyl aluminum and 5.5 percent of diisobutyl aluminum hydride.

Example 3

Repeat Example 1, but add no sodium and employ 755 grams of isobutylene, an initial hydrogen pressure of 1800 p.s.i.g. and a reaction temperature of 165° C. Prior to the present example, the autoclave employed had been used in a series of runs with from 0.37 to 0.79 percent by weight of sodium based on the aluminum, and then in two successful additional runs in which no activator (sodium) was employed. The reaction starts in 20 minutes and is complete in 2 hours. Six hundred seventeen (617) grams of product are obtained representing a yield of 90.0 percent, based on the aluminum. The crude product analyzes 13.5 percent aluminum and contains 77.5 percent triisobutyl aluminum and 17.2 percent diisobutyl aluminum hydride.

The above example illustrates the effectiveness of trace amounts of the activator.

Example 4

Repeat Example 1, but employing 0.6 gram of sodium (0.55 percent by weight of the aluminum) in a 50 percent by weight dispersion in xylene, 108 grams (4 mols) of an atomized aluminum powder having an average particle size of 30 microns and 750 grams of isobutylene. The screen analysis of this aluminum powder showed 100 percent through a 12 mesh screen, 21.2 percent retained on a 100 mesh screen, 22.8 percent retained on a 200 mesh screen, 14.4 percent retained on a 325 mesh screen and 41.6 percent through the 325 mesh screen. The reaction temperature is maintained at 165° C. The reaction begins in 20 minutes and is complete in 2¼ hours. Six hundred sixty-five (665) grams of product are obtained, representing a yield of 80 percent based on the aluminum. The crude product analyzes 15.18 percent aluminum and contains 54.9 percent of triisobutyl aluminum and 39.4 percent of diisobutyl aluminum hydride.

Example 5

Repeat Example 1, but employing 1.0 gram of sodium (0.93 percent by weight of the aluminum) in a 50 percent by weight dispersion in xylene, 81 grams of an atomized aluminum powder having an average particle size of 25 microns, 748 grams of isobutylene, and an initial hydrogen pressure of 1800 p.s.i.g. The screen analysis of this aluminum powder showed 100 percent through a 40 mesh screen, 25.2 percent retained on a 100 mesh screen, 23.0 percent retained on a 200 mesh screen, 14.0 percent retained on a 325 mesh screen and 37.8 percent through the 325 mesh screen. The reaction temperature is maintained at 165° C. The reaction begins immediately upon reaching the reaction temperature and is complete in 1⅔ hours. The product obtained equals 726.5 grams, representing a yield of 84.2 percent, based on the aluminum. The crude product analyzes 13.99 percent aluminum and contains 68.2 percent of triisobutyl aluminum and 28.4 percent of diisobutyl aluminum hydride.

Example 6

Repeat Example 1, except employ 35.4 grams of aluminum turnings of the approximate dimensions ⅛″ x 1″ x ¹⁄₃₂″, 2.3 grams of a 35 percent by weight dispersion of sodium in white oil (2.27 percent by weight of sodium on the aluminum), 72 grams of crude triisobutyl aluminum, 283 grams of isobutylene, and an initial hydrogen pressure of 1800 p.s.i.g. The reaction temperature is maintained at 165° C. The reaction begins in 90 minutes and is complete in 11½ hours. The isobutyl aluminum product obtained equals 116 grams.

Example 7

Repeat Example 1, except employ as the activator 0.5 gram of lithium wire (not dispersed in solvent) having a diameter of 1.5 to 2 mm. and cut into pieces of about 5 to 10 mm. in length, 54 grams of the aluminum powder, 54 grams of crude triisobutyl aluminum, 414 grams of isobutylene, and an initial hydrogen pressure of 1800 p.s.i.g. The temperature is maintained at 165° C. The reaction starts in 30 minutes and is complete in 1¾ hours. The isobutyl aluminum product obtained equals 372 grams.

Example 8

Repeat Example 7, except employ as the activator 3.5 grams of 70 to 80 mesh magnesium metal (not dispersed in solvent), 38 grams of crude triisobutyl aluminum and 411 grams of isobutylene. The reaction starts in 5 to 10 minutes and is complete in 4 hours. The weight of product is 332 grams, representing a yield of 76.8 percent based on the aluminum. The crude product analyzes 13.97 percent aluminum and contains 59.8 percent of triisobutyl aluminum and 27.8 percent of diisobutyl aluminum hydride.

Example 9

Repeat Example 1, except employ 7.4 grams of crystalline metallic calcium powder (not dispersed in solvent) as the activator (about 6.8 percent by weight of the aluminum), 108 grams of the powdered aluminum of Example 1, 88 grams of crude triisobutyl aluminum and 754 grams of isobutylene. The temperature is maintained at 165° C. The reaction starts in 40 minutes and is complete in 4 hours. The weight of the product is 620 grams, representing a yield of 74 percent based on the aluminum. The crude product analyzes 15.1 percent aluminum and contains 45.8 percent of triisobutyl aluminum and 45.8 percent of diisobutyl aluminum hydride.

Example 10

Repeat Example 1, except employ 1.0 gram of the sodium activator (1.23 percent by weight of the aluminum), 73 grams of crude triisobutyl aluminum, 728 grams of butene-2, and an initial hydrogen pressure of 1800 p.s.i.g. The reaction temperature is maintained at 182° C. The reaction begins in 10 minutes and is complete in 70 minutes. The weight of crude butyl aluminum product is 450 grams, representing a yield of 95.4 percent based on the aluminum.

Example 11

Repeat Example 10, except employ 1.2 grams of the sodium activator (1.48 percent by weight of the aluminum, 100 grams of n-heptane in place of the crude triisobutyl aluminum), and 746 grams of butene-2. The reaction begins immediately and is complete in 2 hours. After distilling off the n-heptane solvent, the weight of crude product is 423.7 grams, representing a yield of 78.5 percent based on the aluminum. The crude product analyzes 14.99 percent aluminum, and contains 26.3 percent of a mixture of tri-n-butyl aluminum and tri-sec-butyl aluminum, and 56.2 percent of a mixture of di-n-butyl aluminum hydride and di-sec-butyl aluminum hydride.

Example 12

Repeat Example 11, except employ 1.5 grams of sodium (1.85 percent by weight of the aluminum) and 640 grams of pentene-2. The reaction begins in 20 minutes and is complete in 3 hours. After distilling off the heptane, the weight of crude pentyl aluminum product is 369 grams analyzing 14.2 percent aluminum, representing a yield of 64.7 percent based on the aluminum.

Example 13

Repeat Example 1, except employ 54 grams of the powdered aluminum, 1.5 grams of sodium (2.8 percent by weight of the aluminum), no crude triisobutyl aluminum, and 730 grams of mixed heptenes. The heptenes are obtained by the copolymerization of propylene and butylenes in the presence of a phosphoric acid catalyst, the fraction of the copolymer boiling between 170° and 210° F. and having a heptene content of 90 to 100 percent being used as the charge stock. The initial hydrogen pressure is 1800 p.s.i.g. and the reaction temperature is maintained at 182° C. The reaction begins in 10 minutes and is complete in 3¼ hours. After distilling off the excess olefin reactant, the weight of crude aluminum heptyls obtained is 218 grams.

Example 14

Repeat Example 13, except employ 36 grams of the powdered aluminum, 1.5 grams of sodium (4.2 percent by weight of the aluminum), 534 grams of octene-2, and an initial hydrogen pressure of 2000 p.s.i.g. The reaction begins in 20 minutes and is complete in 4 hours. After distilling off the excess octene-2, the weight of crude aluminum octyls obtained is 337 grams.

Example 15

Repeat Example 1, except employ 164 grams of the powdered aluminum, 2.25 grams of sodium (1.4 percent by weight of the aluminum), 98 grams of crude triisobutyl aluminum, 1164 grams of isobutylene, and an initial hydrogen pressure of 200 p.s.i.g. The reaction temperature is 165° C. and upon reaching this temperature, the pressure in the autoclave is 1400 p.s.i.g. The reaction begins in 65 minutes. After a drop in pressure to 1200 p.s.i.g., additional hydrogen is added to restore the pressure to 1400 p.s.i.g. This hydrogen repressuring is continued through the reaction until the pressure drop is negligible. The reaction is complete in 5¼ hours. The weight of crude product is 1235 grams, representing a yield of 93.8 percent based upon the aluminum. The crude product analyzes 13.34 percent aluminum, and contains 75.7 percent of triisobutyl aluminum and 15.9 percent of diisobutyl aluminum hydride.

Example 16

Repeat Example 13, except employ 855 grams of diisobutylene and a reaction temperature of 185° C.

Example 17

Repeat Example 13, except employ 714 grams of styrene.

Example 18

Repeat Example 13, except employ 762 grams of 2-ethylhexene-1.

Example 19

Repeat Example 13, except employ 861 grams of the nonenes obtained by the trimerization of propylene.

Example 20

Repeat Example 13, except employ 1116 grams of the dodecenes obtained by the tetramerization of propylene.

The following examples are illustrative of the separate activation of the aluminum.

Example 21

While maintaining an atmosphere of nitrogen in an autoclave equipped with means for agitation, heating and cooling, charge through a port in the cover of the autoclave 81 grams of the atomized aluminum powder of Example 1. In a similar manner, add 1.7 grams of sodium (2.1 percent by weight of the aluminum) as a 50 percent by weight dispersion in xylene. Also add 86 grams of crude triisobutyl aluminum as a liquid reaction medium. Close the port and pressure in hydrogen until a pressure of 500 p.s.i.g. is obtained. Heat the contents of the autoclave to 180° C. for a period of one hour while continuously agitating. Cool the contents of the autoclave to room temperature and vent to atmospheric pressure. Close the autoclave and pressure in 745 grams of liquid isobutylene with nitrogen. Pressure in hydrogen until a pressure of 2000 p.s.i.g. is reached. While agitating, heat the contents of the autoclave to 150°-155° C. and maintain this temperature throughout the reaction. The pressure at this temperature is 2800 p.s.i.g. As the reaction proceeds, the pressure drops to about 2500 p.s.i.g., at which point hydrogen is pressured in to reach 2800 p.s.i.g. This repressuring is continued throughout the reaction. The reaction is complete in 4 hours. The product is worked up as in Example 1. The weight of crude product obtained is 682 grams, representing a yield of 99 percent, based on the aluminum. The product analyzes 13.7 percent aluminum and contains 84.8 percent triisobutyl aluminum and 11.7 percent of diisobutyl aluminum hydride.

*Example 22*

The procedure of Example 21 is repeated employing 81 grams of the same atomized aluminum powder, 20 grams of sodium (24.7 percent by weight of the aluminum), and 120 grams of crude triisobutyl aluminum. In the activation step, hydrogen is added to a pressure of 1000 p.s.i.g., and the temperature is maintained at 128° C. for a period of 2 hours. After cooling and venting, 716 grams of liquid isobutylene are added and hydrogen is pressured in to 2000 p.s.i.g. The reaction is complete in 2 hours. The aluminum is converted to 840 grams of product of which 515 grams is a mixture of triisobutyl aluminum and diisobutyl aluminum hydride and 325 grams is a solid complex of sodium isobutyl aluminum hydride and other complexes, resulting from the larger quantity of activator.

As has been indicated, a trihydrocarbyl aluminum product containing dihydrocarbyl aluminum hydride is converted substantially completely to the trihydrocarbyl by reacting the product with an excess of olefin reactant. This conversion can be conducted at a temperature in the range of 80° to 100° C., generally under autogenous pressure.

As has been shown hereinabove, aluminum can be activated for the production of aluminum hydrocarbyls without requiring costly and time-consuming mechanical subdivision of the aluminum. The activation is simply and quickly accomplished without the necessity of transferring activated aluminum to a separate reaction vessel, thereby eliminating safety hazards and further reducing manufacturing costs.

Resort may be had to such modifications and variations as fall within the spirit of the invention and the scope of the appended claims.

I claim:

1. A process for the preparation of aluminum hydrocarbyls which comprises contacting aluminum with an activating amount of a material selected from the class consisting of the alkali metals and the alkaline earth metals and reacting the aluminum with an olefinic hydrocarbon and hydrogen to obtain an aluminum hydrocarbyl.

2. A process for the preparation of aluminum hydrocarbyls which comprises reacting aluminum with an olefinic hydrocarbon and hydrogen in the presence of an activating amount of a material selected from the class consisting of the alkali metals and the alkaline earth metals to obtain an aluminum hydrocarbyl.

3. A process for the preparation of aluminum hydrocarbyls which comprises reacting aluminum with an olefinic hydrocarbon and hydrogen in the presence of a trace to about 25 percent by weight, based on the weight of the aluminum, of an activating material selected from the class consisting of the alkali metals and the alkaline earth metals at an elevated temperature and pressure to obtain an aluminum hydrocarbyl.

4. The process of claim 3, wherein the temperature is in the range from about 100° to 240° C. and the pressure is in the range from about 500 to 3400 p.s.i.g.

5. The process of claim 3, wherein the reaction is conducted in an inert solvent.

6. The process of claim 3, wherein the reaction is conducted in an aluminum hydrocarbyl.

7. The process of claim 3, wherein the olefinic hydrocarbon reactant is liquid under the reaction conditions employed.

8. The process of claim 3, wherein the activating material is an alkali metal.

9. The process of claim 3, wherein the activating material is an alkaline earth metal.

10. A process for the preparation of aluminum hydrocarbyls which comprises reacting aluminum with an alpha mono-olefin and hydrogen in the presence of about 0.25 to 2 percent by weight, based on the aluminum, of an activating material selected from the class consisting of the alkali metals and the alkaline earth metals at a temperature of about 150° to 185° C. and a pressure of about 1200 to 3400 p.s.i.g. to obtain an aluminum hydrocarbyl.

11. The process of claim 10, wherein the alpha mono-olefin is isobutylene.

12. A process for the preparation of an isobutyl aluminum which comprises reacting aluminum with isobutylene and hydrogen in the presence of about 0.25 to 2 percent by weight of sodium, based on the aluminum, and in a liquid isobutyl aluminum product of the reaction at a temperature of about 150° to 185° C. and a pressure of about 1200 to 3400 p.s.i.g. to obtain an isobutyl aluminum.

13. A process for the preparation of triisobutyl aluminum which comprises reacting in an atmosphere of an inert gas aluminum with isobutylene and hydrogen in the presence of about 0.25 to 2 percent by weight of sodium, based on the aluminum, and in a liquid product of the reaction containing triisobutyl aluminum, at a temperature of about 150° to 185° C. and a pressure of about 1200 to 3400 p.s.i.g., and recovering a product containing triisobutyl aluminum.

14. A process for the preparation of aluminum hydrocarbyls which comprises contacting aluminum with an activating amount of a material selected from the class consisting of the alkali metals and the alkaline earth metals and thereafter reacting said aluminum with an olefinic hydrocarbon and hydrogen to obtain an aluminum hydrocarbyl.

15. A process for the removal of the oxide film from aluminum which has not been protected from oxidation and has become inactive to activate said aluminum, which comprises contacting with hydrogen, aluminum which is suspended in a liquid medium selected from the group consisting of aluminum alkyls and alkyl aluminum hydrides and having therein as a promoter an alkali metal.

16. The process of claim 15 wherein the suspension of aluminum in a liquid medium is maintained at a temperature of from 60° C. to 240° C.

17. The process of claim 15 wherein said promoter is present to the extent of 0.01 percent to 10 percent based on the total weight of the suspension medium.

18. The process of claim 15 wherein said liquid medium is an alkyl aluminum compound.

19. The process of claim 15 which is carried out at a pressure of from 100 to 3400 pounds per square inch.

20. A process for the activation of aluminum by removing the oxide film from aluminum which has become inactive because it has not been protected from oxidation, comprising contacting hydrogen with inactive aluminum suspended in a compound having the formula $R_2AlY$, in which Y is chosen from the class consisting of alkyl radicals and R is chosen from the class consisting of hydrogen and alkyl radicals and in the presence of a promoter chosen from the class consisting of a metal selected from the group consisting of lithium, sodium, potassium, rubidium, cesium, calcium, strontium and barium.

21. A process for the activation of aluminum, comprising contacting hydrogen with aluminum suspended in a compound having the formula $R_2AlY$, in which Y is chosen from the class consisting of alkyl radicals and R is chosen from the class consisting of hydrogen and alkyl radicals and in the presence of a promoter chosen from the class consisting of a metal selected from the group consisting of alkali metals and alkaline earth metals.

References Cited in the file of this patent

UNITED STATES PATENTS

| | | |
|---|---|---|
| 2,271,956 | Ruthruff | Feb. 3, 1942 |
| 2,787,626 | Redman | Apr. 2, 1957 |

FOREIGN PATENTS

| | | |
|---|---|---|
| 770,707 | Great Britain | Mar. 10, 1957 |
| 1,122,000 | France | May 14, 1956 |

OTHER REFERENCES

Ziegler et al.: Angewandte Chemie, 67, 424 (1955).